United States Patent
Brück et al.

(12) 
(10) Patent No.: US 6,254,837 B1
(45) Date of Patent: Jul. 3, 2001

(54) HONEYCOMB BODY OF REDUCED THERMAL CONDUCTIVITY IN THE INTAKE AND OUTLET REGIONS

(75) Inventors: Rolf Brück, Bergisch Gladbach; Robert Diewald, Siegburg, both of (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/277,283

(22) Filed: Mar. 26, 1999

Related U.S. Application Data

(63) Continuation of application No. PCT/EP97/05096, filed on Sep. 17, 1997.

(51) Int. Cl.⁷ .................................................... B01D 53/94
(52) U.S. Cl. ............................ 422/180; 422/177; 422/179
(58) Field of Search .................................... 422/177, 179, 422/180; 60/299, 300

(56) References Cited

U.S. PATENT DOCUMENTS

| | | | |
|---|---|---|---|
| 3,904,551 | * | 9/1975 | Lundsager et al. ................... 422/180 |
| 4,160,010 | * | 7/1979 | Ottle ..................................... 422/180 |
| 5,370,943 | * | 12/1994 | Bruck et al. ......................... 422/180 |
| 5,554,342 | * | 9/1996 | Hirayama et al. .................... 422/180 |
| 5,651,946 | * | 7/1997 | Dekumbis et al. ................... 422/180 |

FOREIGN PATENT DOCUMENTS

94/17292 * 8/1994 (WO) .

* cited by examiner

*Primary Examiner*—Hien Tran
(74) *Attorney, Agent, or Firm*—Herbert L. Lerner; Laurence A. Greenberg; Werner H. Stemer

(57) ABSTRACT

A honeycomb body conducting a fluid, especially a honeycomb body for an exhaust gas catalyst. The honeycomb body has an inflow area and an outflow area having channels to be cross flown by the fluid. The disclosed honeycomb body has near the inflow and the outflow area respectively a section with reduced heat conductivity, which has recesses formed in the wall of at least some channels of the honeycomb body.

9 Claims, 1 Drawing Sheet

US 6,254,837 B1

HONEYCOMB BODY OF REDUCED THERMAL CONDUCTIVITY IN THE INTAKE AND OUTLET REGIONS

CROSS-REFERENCE TO RELATED APPLICATION

This is a continuation of copending International Application PCT/EP97/05096, filed Sep. 17, 1997, which designated the United States.

BACKGROUND OF THE INVENTION

Field of the Invention

The invention concerns a honeycomb body, in particular for an exhaust gas catalytic converter, through which a fluid can flow and which has an intake region and an outlet region. The intake region and the outlet region are connected together by passages through which the fluid can flow.

Published, International Patent Application WO 90/03220 discloses honeycomb bodies through which a fluid can flow and which can be of the most widely varying cross-sectional shapes. To reduce the polluting components in the exhaust gas flow of an exhaust gas system it is necessary for the honeycomb body to be at a temperature which is sufficiently high for the catalytic reaction of the pollutants. In order to endow the catalytic converter with a performance such that it starts operating as quickly as possible, it has already been proposed in Published, International Patent Application Wo 89/10471 that the honeycomb body is to be electrically heated. Electrical heating of such a honeycomb body reduces the emission of exhaust gas pollutants that are produced in the cold-start phase of an internal combustion engine. The internal combustion engine and the entire exhaust gas system cools down when a motor vehicle is operated in a short-distance mode with interruptions of greater or lesser lengths between the individual travel cycles. Cooling of the exhaust gas system and in particular the honeycomb body in that way has the result that the honeycomb body has to be repeatedly electrically heated. Under some circumstances the consequence of this is that the power source, a battery in a motor vehicle, is severely loaded. When the vehicle is used to cover short distances therefore it is not possible to guarantee that the battery is always sufficiently charged up again.

In order to reduce the amount of power necessary to heat the honeycomb body it has therefore already been proposed that the honeycomb body should be provided with thermal insulation. Thus for example Published International Patent Application WO 90/04087 discloses a honeycomb body with a thermal insulation which is in the form of a double casing system. That double casing system includes an inner tubular casing which is disposed in an outer tubular casing at a spacing relative thereto. The intermediate space between the inner and the outer tubular casings acts as a thermal insulation. That affords a reduction in the emission of heat by the peripheral surface of the honeycomb body.

For the purposes of reducing thermal conductivity U.S. Pat. No. 5,549,873 already discloses a honeycomb body having an intermediate region with a considerably reduced level of thermal conduction. That intermediate region is produced by openings or stamped-out portions provided in the metal sheets of the honeycomb body. The region upstream of the openings serves in practice as a pre-catalyst, that is to say that partial region of the honeycomb body forms a mass which can rapidly heat up immediately after a cold start of the engine, while in the region of the main catalyst the carrier body forms a substantially larger number of flow paths so that there too a shorter active catalytic surface area is made available.

SUMMARY OF THE INVENTION

It is accordingly an object of the invention to provide a honeycomb body of reduced thermal conductivity in the intake and outlet regions that overcome the above-mentioned disadvantages of the prior art devices of this general type, in which the heat losses of the honeycomb body are further reduced.

With the foregoing and other objects in view there is provided, in accordance with the invention, a honeycomb body, including: an intake region; an outlet region; and passages connected between the intake region and the outlet region for conducting a fluid flow, the passages in a proximity of the intake region having an intake portion of reduced thermal conductivity and the passages in a proximity of the outlet region having an outlet portion of reduced thermal conductivity.

The honeycomb body according to the invention is distinguished in that it has a portion of reduced thermal conductivity at least in the proximity of the intake and the outlet region. It has surprisingly been found that, in the case of honeycomb bodies, in particular for an exhaust gas catalytic converter, the heat losses at the ends, due to the conduction of heat to the components of an exhaust gas system which are connected to the honeycomb body, and due to convection of the exhaust gas in the exhaust gas system, make a considerable contribution to the overall heat losses. The honeycomb body according to the invention is proposed to avoid those heat losses, in particular at the ends. The fact that a respective portion of reduced thermal conductivity is provided in the proximity of each of the intake and the outlet regions provides for substantial thermal decoupling of the honeycomb body from adjacent components of an exhaust gas system. The portion that is of a reduced thermal conductivity extends at least partially into the honeycomb body.

Because the honeycomb body has a portion of reduced thermal conductivity in the proximity of each of the intake and outlet regions, the thermal losses of the central portion are reduced, whereby the portion of the honeycomb body which is between the intake and outlet regions is at a higher temperature over a longer period of time than is the case with the known honeycomb bodies. This provides for an improved cleaning action for an exhaust gas after re-starting as the honeycomb body between the intake and the outlet regions is at a higher temperature level. Consequently the portion between the intake and the outlet regions heats up substantially more quickly, whereby the temperature required for catalytic reaction is also reached more rapidly.

A preferred configuration of the honeycomb body is one in which the portion of the reduced thermal conductivity extends over the entire cross-section of the honeycomb body. A reduction in the level of thermal conductivity of the honeycomb body can be achieved by the wall of at least one of the passages thereof being at least partially of reduced wall thickness or gauge. That reduces the cross-section in the heat transportation direction.

In accordance with a further advantageous configuration of the honeycomb body it is proposed that the portion of reduced thermal conductivity is formed by the wall of at least one of the passages having at least one opening. With such a configuration for the honeycomb body the cross-section of the honeycomb body which is available for heat transport is reduced. It is to be noted however that the strength of the honeycomb body can be adversely affected by the provision of the openings in the wall. Such an adverse effect in terms of the strength of the honeycomb body does not occur if however the portion, without openings, includes a heat-insulating material.

The provision of openings in a honeycomb body can be effected prior to, during or after the procedure for producing the honeycomb body. If the honeycomb body is formed by wound and/or stratified or stacked layers of at least partially structured metal sheets the operation of producing the openings is to be effected prior to the step of winding or stratifying the layers of the sheets.

A honeycomb body through which a fluid can flow and which has a respective portion of reduced thermal conductivity in the proximity of the intake and outlet regions is suitable in particular as a honeycomb body for an exhaust gas catalytic converter, and preferably is disposed in a tubular casing.

Ideally, the tubular casing has a portion of reduced thermal conductivity in the proximity of the intake and outlet regions. For this purpose it is proposed that the portion is formed by openings in the tubular casing. The openings in the tubular casing or in the honeycomb body, may involve perforations. The portion of reduced thermal conductivity is preferably disposed in aligned relationship. The interrelationship already referred to above between the physical configuration of the honeycomb body and the attainment of a temperature necessary for catalytic reaction of an exhaust gas after re-starting an internal combustion engine is even further enhanced if the tubular casing in which the honeycomb body is disposed has a respective portion of reduced thermal conductivity in each of the intake and outlet regions. That configuration provides that the thermal conduction from the tubular casing to adjacent components of an exhaust gas system is significantly reduced.

Other features which are considered as characteristic for the invention are set forth in the appended claims.

Although the invention is illustrated and described herein as embodied in a honeycomb body of reduced thermal conductivity in the intake and outlet regions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
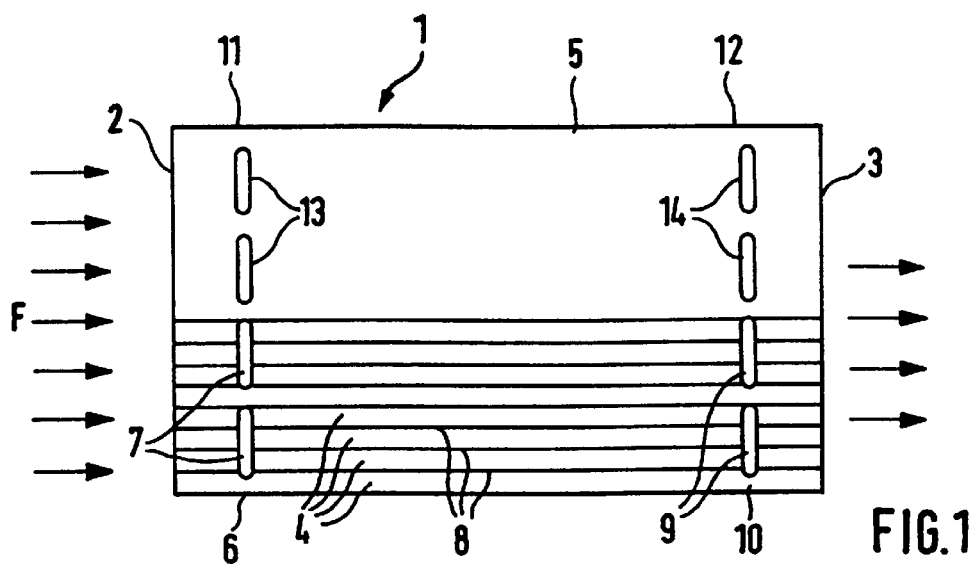
FIG. 1 is a diagrammatic, partially broken, top plan view of a first embodiment of a honeycomb body according to the invention, and FIG. 2 a longitudinal, sectional view of a second embodiment of the honeycomb body in an exhaust gas system.

In all the figures of the drawing, sub-features and integral parts that correspond to one another bear the same reference symbol in each case. Referring now to the figures of the drawing in detail and first, particularly, to FIG. 1 thereof, there is shown a honeycomb body 1 through which a fluid F can flow. The honeycomb body 1 has an intake region 2 and an outlet region 3. The intake region 2 and the outlet region 3 are connected together by passages 4 through which the fluid F can flow. The honeycomb body 1 is disposed in a tubular casing 5. A portion 6 of reduced thermal conductivity is provided in the honeycomb body 1 in the proximity of the intake region 2. The portion 6 is formed by openings 7. The openings 7 are provided in a wall 8 of the passages 4 and extend at least partially transversely to the flow direction of the fluid as indicated at F. Provided in the proximity of the outlet region 3 are openings 9 which form a portion 10 of reduced thermal conductivity. The openings 9 are disposed in the wall 8 of the passages 4. The casing 5 also has a portion 11 and a portion 12 of reduced thermal conductivity in the intake and outlet regions 2, 3 respectively of the honeycomb body 1. The portions 11, 12 are formed with openings 13 and 14 respectively. In the embodiment illustrated in FIG. 1 the openings 7, 9, 13 and 14 respectively of the portions 6, 10, 11 and 12 respectively are in the form of slots. They are of the same configuration both in the tubular casing 5 and also in the honeycomb body 1.

Figure 2:
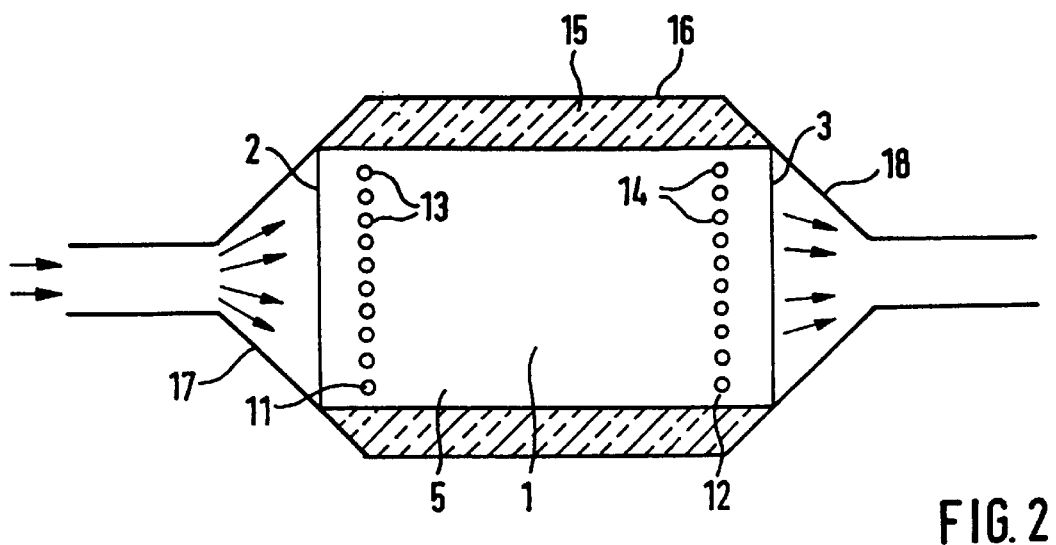

Alternatively the openings 13, 14 can be of a circular cross-section, as is shown in FIG. 2. The openings 13, 14 are preferably between 5 and 15 mm behind the respective end face 2, 3 of the honeycomb body in one plane. FIG. 2 shows the configuration of the honeycomb body 1 in an exhaust gas system of an internal combustion engine. The honeycomb body 1 has the tubular casing 5 that has the openings 13 in the proximity of the intake region 2 and the openings 14 in the proximity of the outlet region 3. The casing 5 of the honeycomb body 1 is enclosed by an insulating material 15. The insulating material 15 is enclosed by an outer tubular casing 16. Provided in front of the intake region 2 is a diffuser 17 that is connected to the outer tubular casing 16. Provided at the outlet region 3 is a confuser 18 that is connected to the outer tubular casing 16. The portions 11 and 12 respectively of the outer tubular casing 5 and also the portions 6 and 10 respectively of the honeycomb body 1 which preferably include stratified or wound metal sheets reduce a heat emission from a center of the honeycomb body 1 to the confuser 18 or diffuser 17 or into the gas spaces in front of same. That provides for a substantially hot "cell" which is defined by the thermal insulation 15 and the portions 6, 10, 11 and 12 of reduced thermal conductivity. This affords a configuration that is better in terms of energy, for an exhaust gas cleaning system.

We claim:

1. A honeycomb body, comprising:

an intake region;

an outlet region;

passages connected between said intake region and said outlet region for conducting a fluid flow, said passages in a proximity of said intake region having an intake portion of reduced thermal conductivity and said passages in a proximity of said outlet region having an outlet portion of reduced thermal conductivity; and a tubular casing having a length, portions of reduced thermal conductivity in each of a proximity of said intake region and said outlet region, and a constant total cross-section with respect to a direction of flow from said intake region to said outlet region over said length, said tubular casing surrounding said passages, said intake region, and said outlet region.

2. The honeycomb body according to claim 1, wherein said passages combined have a total cross-section and each of said intake portion and said outlet portion extending entirely over said total cross-section of said passages.

3. The honeycomb body according to claim 1, wherein said passages have walls and said walls in said intake portion and said outlet portion of at least some of said passages are at least partially of reduced wall thickness.

4. The honeycomb body according to claim 1, wherein said passages have walls and at least some of said walls in said intake portion and said outlet portion have at least one opening formed therein.

5. The honeycomb body according to claim 1, including a heat-insulating material surrounding said intake portion and said outlet portion.

6. The honeycomb body according to claim 1, wherein said passages, said intake region and said outlet region are formed by at least one of wound and stratified layers of at least partially structured metal sheets.

7. The honeycomb body according to claim 1, wherein said portions of said tubular casing are each aligned with one of said intake portion and said outlet portion.

8. The honeycomb body according to claim 1, wherein said portions of said tubular casing have openings formed therein.

9. An exhaust gas catalytic converter, comprising:

a honeycomb body including:
- an intake region;
- an outlet region;
- passages connected between said intake region and said outlet region for conducting a fluid flow, said passages in a proximity of said intake region having an intake portion of reduced thermal conductivity and said passages in a proximity of said outlet region having an outlet portion of reduced thermal conductivity; and a tubular casing having a length, portions of reduced thermal conductivity in each of a proximity of said intake region and said outlet region, and a constant total cross-section with respect to a direction of flow from said intake region to said outlet region over said length, said tubular casing surrounding said passages, said intake region, and said outlet region.

* * * * *